Patented July 17, 1934

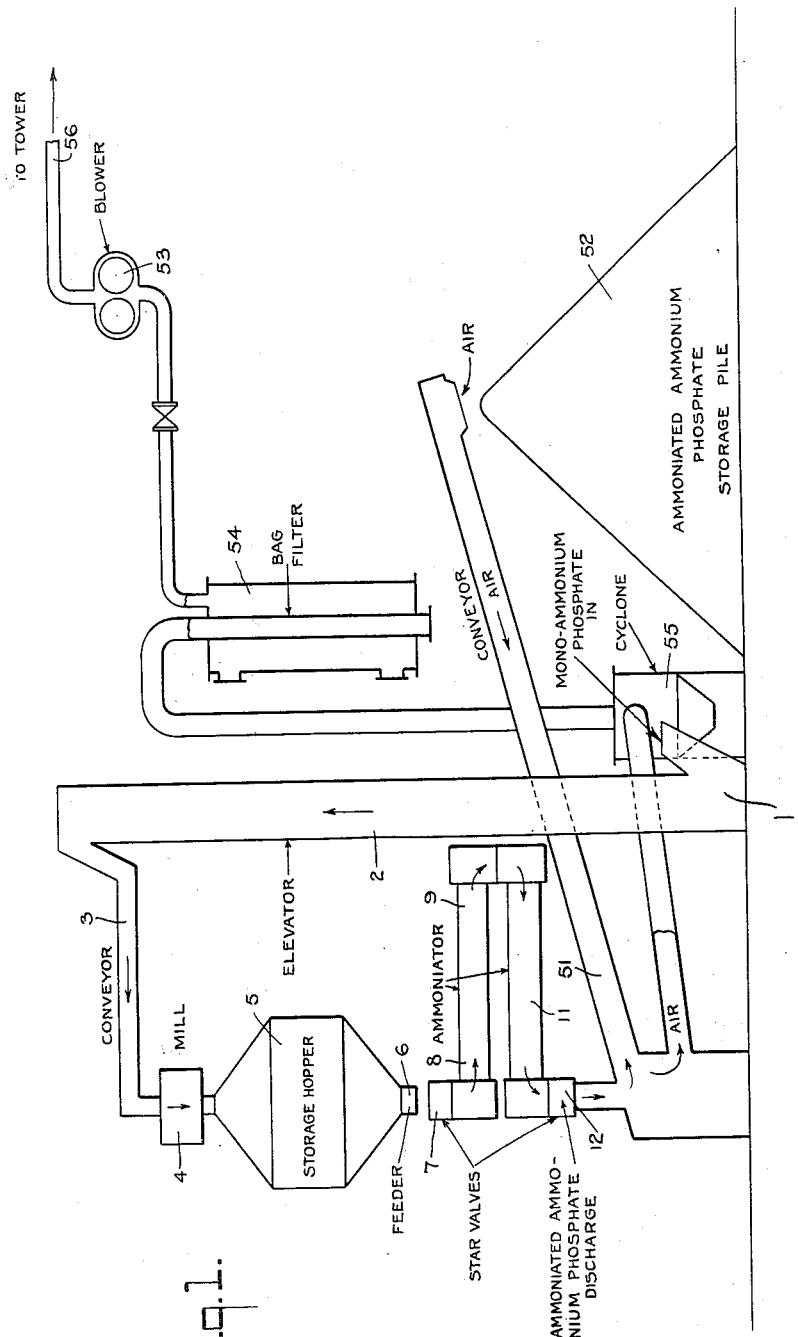

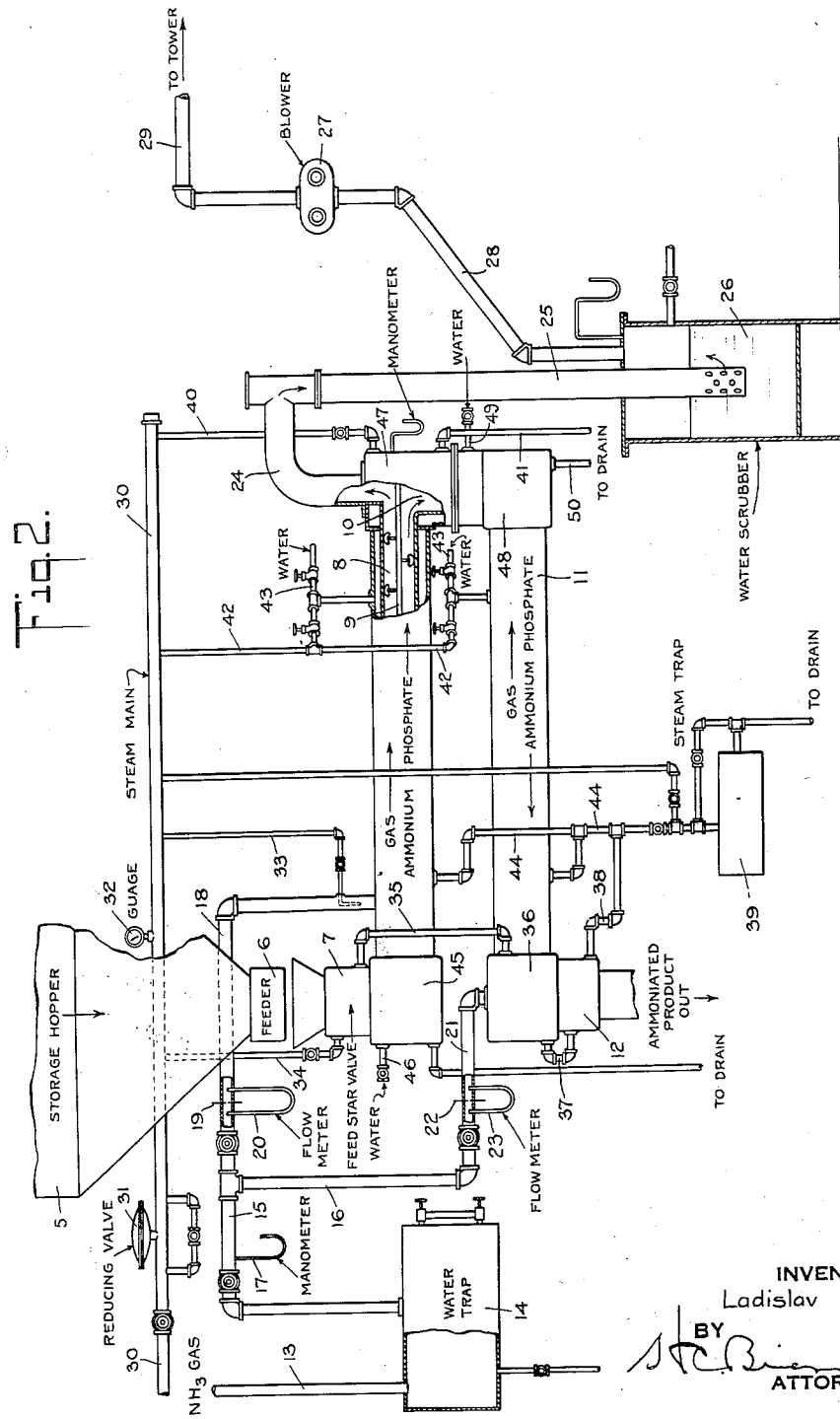

1,967,049

UNITED STATES PATENT OFFICE 1,967,049

METHOD OF AMMONIATING

Ladislav Boor, Roselle, N. J., assignor to American Cyanamid Company, New York, N. Y., a corporation of Maine Application April 6, 1929, Serial No. 353,034

4 Claims. (Cl. 23—106)

This invention relates to a method of and apparatus for the continuous ammoniation of mono-ammonium phosphate or mixtures containing the same, to cause conversion to di-ammonium phosphate, in order to produce a fertilizer material having a high nitrogen content.

In a co-pending application of Guy H. Buchanan, Serial No. 164,345, filed January 28, 1927 (now Patent No. 1,785,375) and entitled "Ammonium phosphate fertilizer composition and method of making the same" assigned to American Cyanamid Company, there is disclosed a method of increasing the available nitrogen content of a monoammonium phosphate fertilizer by a batch treatment of mono-ammonium phosphate with ammonia gas in a drum or the like. Certain disadvantages were inherent in this process, due principally to the fact that it was a batch process and, therefore, full efficiency could not be secured, and the product was not always uniform.

In my co-pending application, Serial No. 339,466 filed February 12, 1929 and entitled "Method of and apparatus for treating ammonium phosphate", and assigned to American Cyanamid Company, there is described a continuous method of ammoniating mono-ammonium phosphate by treatment with ammonia gas, and that invention is an improvement upon the Buchanan invention above mentioned. According to my invention, mixtures containing mono-ammonium phosphate were treated under certain conditions with ammonia gas in the presence of moisture, the reactants being continuously supplied at one end of the apparatus and the ammoniated product continuously discharged at the other end.

The present invention consists of certain refinements and improvements upon both the Buchanan and Boor inventions above mentioned, whereby a more uniform product may be secured, at maximum speed with the minimum amount of attention to the apparatus.

The present invention consists essentially in aging mono-ammonium phosphate, or mixtures containing the same, until the moisture content thereof becomes constant, grinding the same to a size which will enable maximum penetration of and ammoniation by ammonia gas in the presence of moisture, the carrying out of the ammoniation step under effective conditions of moisture content, temperature, and pressure, the discharge of the ammoniated product under such conditions that excess or entrained ammonia may be removed and recovered therefrom, and the aging of the ammoniated product until its moisture is substantially constant in order to prevent caking upon being packaged and shipped.

The invention further consists in an apparatus for carrying out the above process.

In the drawings:

Fig. 1 represents diagrammatically the apparatus used for carrying out the invention, and Fig. 2 is a further diagrammatic view more in detail and partly in section, showing the refinements accompanying the ammoniation step.

In carrying out the invention I have found it expedient to make use of a mixture containing mono-ammonium phosphate, with or without additions of ammonium sulfate or potassium chloride, such that an analysis of the mixture will show substantially 13% $NH_3$ and 48% $P_2O_5$.

This mixture is preferably aged in a pile with free access to air until the moisture content thereof has become substantially constant. I have found that approximately a week will give this desirable result. In this condition the mono-ammonium phosphate may be ground easily and handled in the ammoniating tubes with materially less trouble.

By starting with an initial material in which the moisture content is uniform and constant, I am able to secure a more uniform product with greater facility, due to the fact that the moisture additions in the ammoniating step require less adjustment and the danger of overwetting is materially reduced, all as will be more fully pointed out hereinafter.

The bulk material containing mono-ammonium phosphate is then removed from the drier piles and placed in the feed spout 1 of an elevator 2, by which it is carried to a conveyer 3 which delivers the dried material to a mill 4 of any suitable construction.

Experiment has shown that with $\frac{3}{16}$" grates on the mill, and using a reasonably dry mono-ammonium phosphate containing approximately 3% moisture, the mill will efficiently grind this product and produce a material all of which will pass through a six mesh screen. Material of this mesh size has been found to absorb ammonia readily and gives no mechanical trouble during ammoniation.

From the mill the ground material drops into a storage hopper 5 from which it is fed by any suitable feeder 6 into a jacketed star valve 7 of any desired construction which will provide a loose seal for the gas in the tubes. Such a valve is disclosed in my co-pending application Serial No. 339,466. The star valve delivers the material directly into the end of a jacketed ammoniating tube 8 arranged horizontally and provided with rotatable stirring means 9 on the inside thereof, so arranged and driven as to advance the material delivered thereto horizontally through the tube to the other end thereof, dropping the same through the throat 10 into a lower jacketed ammoniating tube 11, also provided with stirring means, by which the material is advanced in the opposite direction and to the other end of the bottom tube and discharged through a second jacketed star valve 12 as an ammoniated product.

Ammonia gas is delivered to the apparatus through the inlet pipe 13, from any desired source, the trap 14 collecting any entrained moisture. From this portion of the apparatus the gaseous ammonia passes through the pipes 15 and 16, the pressure of the ammonia therein being indicated by a manometer 17. The top ammoniating tube 8 receives its ammonia through the pipe 18, the flow of the gas being controlled by the size of the orifice in the usual device 19, its flow being indicated by the flowmeter 20. The lower ammoniating tube 11 receives its ammonia gas through the pipe connected to pipe 16 and controlled by an orificial device 22 and a flowmeter 23.

An offtake 24 is provided at the end of ammoniating tube 8 opposite to that at which the ammonia is introduced, which is connected with a pipe 25 dipping below the level of water in a scrubber 26. A blower of any desired type 27 is connected to the scrubber through pipe 28, and is so arranged as to create a partial vacuum in the scrubber, with the result that a flow of gas is induced through the apparatus. The excess ammonia drawn through the blower passes out of the pipe 29 to a recovery tower or the like.

From the above description it will be seen that in the top ammoniating tube the gaseous ammonia and the mono-ammonium phosphate travel in the same direction. When the end of the tube is reached the partially converted mono-ammonium phosphate drops through the throat 10 into the lower ammoniating tube 11 and reverses its direction of flow. At this point it meets fresh ammonia gas entering through the pipe 21 and traveling through the tube in a counter-current manner, and this gas completes the ammoniation as well as removes excess moisture, the excess ammonia being taken off through the pipe 24, as above described. Any entrained mono or di-ammonium phosphate in the exhaust gases, is caught in the water scrubber 26, and is recovered.

It has been found that the maximum ammoniation takes place when the moisture content of the mono-ammonium phosphate or a mixture thereof is approximately 5% to 6% by weight. If the moisture content of the aged mono-ammonium phosphate delivered to the storage hopper is below this proportion, then additional moisture is added to the charge to produce this desirable ratio.

I find it convenient to use steam for supplying this moisture where such additions are necessary, and for this purpose I provide a steam main 30 having the usual reducing valve 31 and gauge 32, and a delivery pipe 33 which conducts the proper amount of steam directly into one end of the top ammoniating tube 8, substantially at the point of admission of ammonia gas. I find it unnecessary to add moisture to the bottom tube. As above pointed out, where the mono-ammonium phosphate entering through the star valve contains from 5% to 6% moisture, no steam is necessary so that the admission of steam to the apparatus will be dependent upon the moisture content of the initial material.

In some cases it has been found necessary to cool the reaction chambers, by reason of the fact that the ammoniation may develop a degree of heat sufficient to cause melting of the charge, while on the other hand it may be desirable in some cases to initially heat the tubes in order to start a reaction. For this reason both tubes, the ends thereof, the throat connecting the same and the feed and discharge star valve are jacketed and may be supplied either with heating steam or cooling water according to the circumstances. It has been found desirable to maintain different portions of the apparatus at different temperatures in order to produce efficient results, as will be more fully described hereinafter.

Steam may be admitted to the jacket surrounding the feed star valve 7 through a bleeder 34 connected to the steam main 30, the steam passing from the jacketed star valve 7 through the pipe 35 to a jacket 36 surrounding the discharge end of the bottom tube 11 and from that portion of the apparatus through the pipe 37 to the jacket surrounding the star valve 12. Suitable connections 38 conduct the steam or condensed water to a trap 39 for disposal.

In the same manner a bleeder 40 connects the steam main 30 with a jacket surrounding the opposite end of tube 8, the pipe 41 conducting the steam or condensed water to the trap or drain as desired.

The jackets surrounding the ammoniating tubes between the ends thereof, may receive steam for heating purposes through the bleeder 42 or cooling water through the pipes 43, the steam or water as the case may be, dropping through the pipe 44 to the trap 39 or drain.

Suitable temperature indicating devices may be located at various portions of the apparatus to apprise the operator of the temperature existing therein, but not shown as they are well known to those skilled in this art.

In carrying out the process with the apparatus disclosed, it has been found that efficient results are obtained by heating the jacket surrounding the feed star valve 7 to a point just warm enough to prevent excessive condensation of moisture on the vanes thereof, as otherwise there would be a tendency to clog this part of the equipment. Usually a temperature of about 60° C. will be sufficient at the beginning of a run, after which this temperature will be automatically maintained.

The mono-ammonium phosphate or a mixture containing the same, drops from the feed valve into the left-hand end of tube 8 directly below the same, and the blades begin to move the material to the opposite end of the tube. It is preferable to maintain cold water in the jacket 45 surrounding the head of this tube through pipe 46 to hold its temperature at approximately 25° to 30° C. If this head gets too hot the incoming mono-ammonium phosphate is heated up too quickly and does not condense sufficient moisture to give good conversion.

I have found that if the body of the top ammoniating tube is initially heated by steam to 80° to 90° C. and the steam then turned off, this temperature may be maintained by the exothermic reaction, when about 960 lbs. of material are fed through the tube per hour. The temperature of the material within this tube gradually builds up toward the right-hand end thereof, reaching at that point from 80° to 100° C.

Since the ammonia gas and moisture exhaust pipe 24 passes through the right-hand end of the top tube 8, it is necessary to heat the jacket 47 surrounding it to approximately 90° to 100° C. to avoid condensation at this point.

The jacket 48 surrounding the end of the bottom tube immediately below the throat 10 should be kept at approximately 20° to 40° C. by means of cooling water entering through the pipe 49 and discharging through pipe 50, to avoid melting the damp charge which drops from the top tube into the zone of fresh ammonia gas.

Very vigorous reaction in the bottom tube tends to raise the temperature and hence cooling is necessary to prevent melting of the charge. This may be done by admitting cooling water through the pipes shown, independently of the steam or water admission to the jacket of the top tube.

The temperature of the head on the left-hand end of the bottom tube 11 and the discharge star valve 12 should be approximately 50° C. and this may be maintained by the steam entering through the pipes 35 and 37 respectively.

It is to be expected that variation in moisture content of the material being treated and variations of feed rate will necessitate changing these temperatures somewhat to maintain high conversion and good mechanical operation.

In operating the device as above described it will be seen that mono-ammonium phosphate or a mixture containing the same, drops into the top tube and comes into contact with the steam entering at that point which condenses on the material particles. At the same time gaseous ammonia is absorbed by the moist material, evolving heat. As the material proceeds through the tube its temperature rises and the vapor pressure of the water contained in the material increases, but its tendency to evaporate is held back by the moist saturated gas travelling in a parallel direction. At the end of the tube 8, the charge has reached its maximum degree of wetness and drops into the lower tube 11 where it is stirred and conveyed through the length thereof counter-current to a flow of fresh ammonia gas, which completes the ammoniation and dries the product. Both streams of ammonia flow from the front toward the top rear head where the excess is exhausted along with the moisture through the offtake 24. Substantially dry di-ammonium phosphate is discharged through the star valve 12.

This ammoniated product is dropped upon a housed conveyor 51 (Fig. 1) through which air travels in a counter-current manner, this air removing the entrained ammonia from the di-ammonium phosphate particles, the substantially dry, substantially ammonia free di-ammonium phosphate being discharged into a pile 52. It is preferable to age this product in a pile until it has completely dried and its moisture content has become substantially constant, which eliminates to a great degree the tendency to cake in the shipment packages.

The air provided for removing the entrained ammonia from the ammoniated product is induced to flow through the apparatus by means of a blower 53 connected with a bag filter 54, a cyclone 55, and a conveyor 51. Any coarse particles of di-ammonium phosphate carried by this air are first removed in the cyclone, and the remaining finer particles caught in the bag filter 54. The mixture of air and gaseous ammonia is then conducted under impulse of the blower 53 through the pipe 56 to a recovery tower or the like.

The quantity and rate of flow of ammonia gas delivered to the apparatus should be such as will insure the presence of a sufficient amount to substantially complete the ammoniation of the entire quantity of mono-ammonium phosphate and to remove the excess moisture therefrom. As has been pointed out above, when the reactants reach the right-hand end of the top tube they have a maximum degree of wetness and, therefore, one of the important functions performed in the lower or last tube is the complete removal of the excess moisture from the ammoniated product. This may be done very efficiently by a sufficient flow of ammonia gas. Any unchanged ammonia passing through the apparatus and exhausted by the blower, may, of course, be recovered by any suitable means so that even though a material quantity of ammonia in excess of that calculated to convert the mono-ammonium phosphate to di-ammonium phosphate, is used, it is not a wasteful process.

By carrying out the above operations I have been able to produce on a commercial scale a product analyzing substantially 20% NH$_3$ and 44% P$_2$O$_5$ with a minimum amount of effort and skilled labor while at the same time maintaining a uniformity of product not heretofore accomplished.

While specific temperatures, rates of feed and analyses of initial and final product have been given, yet obviously I do not wish to be limited strictly thereto, or to the procedure or apparatus herein disclosed, as various departures may be made from the specific embodiment shown without departing from the spirit of the invention. Many factors will enter into the cycle of operations dependent upon local conditions, and changing any one of these factors may necessitate changes of details throughout the process without, however, essentially changing the cycle of operations herein disclosed.

What I claim is:

1. A method of ammoniating solid mono-ammonium phosphate which consists in feeding solid mono-ammonium phosphate, ammonia and steam to an ammoniating apparatus, and maintaining the mono-ammonium phosphate passing through the feeding means above a temperature at which moisture will condense thereon.

2. A method of ammoniating solid mono-ammonium phosphate which consists in feeding mono-ammonium phosphate to an ammoniating apparatus, thereafter adding ammonia and steam, and cooling the mono-ammonium phosphate before contact with the steam to cause a condensation of the steam on the particles of mono-ammonium phosphate.

3. A method of ammoniating solid mono-ammonium phosphate which consists in feeding mono-ammonium phosphate, ammonia and steam into an ammoniating apparatus, heating the phosphate passing through the feed device to a temperature above that at which steam will condense thereon, and thereafter cooling the mono-ammonium phosphate to cause a steam condensation thereon.

4. A method of ammoniating solid mono-ammonium phosphate which consists in contacting solid mono-ammonium phosphate with steam and ammonia, exhausting unreacted ammonia and moisture in the form of vapors, and applying heat to the said vapors as they are exhausted to prevent condensation thereof.

LADISLAV BOOR.